(12) United States Patent
Bonucci et al.

(10) Patent No.: US 11,641,048 B2
(45) Date of Patent: May 2, 2023

(54) BATTERY TERMINAL

(71) Applicant: TE CONNECTIVITY BRASIL INDUSTRIA DE ELECTRONICOS LTDA, Braganca Paulista (BR)

(72) Inventors: Gustavo Bonucci, Braganca Paulista (BR); Luis Altero, Braganca Paulista (BR); Agnelo Bartolomeu Cavallaro, Itatiba (BR); Rafael Kazuo Sato T Leme, Braganca Paulista (BR)

(73) Assignee: TE Connectivity Brasil Industria De Eletronicos LTDA, Sao Paulo (BR)

( * ) Notice: Subject to any disclaimer, the term of this patent is extended or adjusted under 35 U.S.C. 154(b) by 237 days.

(21) Appl. No.: 17/065,134

(22) Filed: Oct. 7, 2020

(65) Prior Publication Data
US 2022/0109134 A1 Apr. 7, 2022

(51) Int. Cl.
*H01M 50/543* (2021.01)
*H01M 50/172* (2021.01)
*H01M 50/50* (2021.01)

(52) U.S. Cl.
CPC ....... *H01M 50/543* (2021.01); *H01M 50/172* (2021.01); *H01M 50/50* (2021.01)

(58) Field of Classification Search
CPC ... H01M 50/50; H01M 50/502; H01M 50/509
See application file for complete search history.

(56) References Cited

U.S. PATENT DOCUMENTS

| | | | |
|---|---|---|---|
| 2015/0171401 A1* | 6/2015 | Kim | H01M 50/502 429/158 |
| 2016/0126530 A1* | 5/2016 | Kato | H01R 11/283 429/121 |

\* cited by examiner

*Primary Examiner* — Ula C Ruddock

(57) ABSTRACT

A battery terminal connector assembly for attaching to a terminal post of a battery includes a biasing portion and a post engagement portion. The biasing portion has a first terminal post receiving opening. A biasing wall extends about a circumference of the first terminal post receiving opening. The post engagement portion has a second terminal post receiving opening for receiving the battery terminal post therein. Engagement walls extend about a circumference of the second terminal post receiving opening. The biasing portion is movable relative to the post engagement portion between a first insertion position and a second termination position. As the biasing portion is moved from the first insertion position to the second termination position, the biasing wall engages the engagement walls and moves the engagement walls into mechanical and electrical engagement with the battery terminal post positioned in the second terminal receiving opening of the post engagement portion.

20 Claims, 5 Drawing Sheets

BATTERY TERMINAL

FIELD OF THE INVENTION

The present invention is directed a battery terminal for terminating to a battery terminal post. In particular, the invention is directed to a battery terminal with has provides sufficient retention force with less components.

BACKGROUND OF THE INVENTION

Batteries are used as a mobile source of power for a wide variety of devices and equipment. Batteries are also used in many vehicles and other types of equipment to ignite a combustion engine. For those devices in which a battery is used, the terminals of the battery are electrically connected to the electrical system in that device equipment or vehicle. Thus, battery terminal connectors are required for connecting the battery to an electrical system in, for example, an automobile, watercraft, recreational vehicle, tractor, truck, lawn mower, etc.

Periodically, it is necessary for a battery to be replaced. This may occur because the battery loses the capacity to function properly by being depleted of its charge. In some cases, such as in an automobile, the battery is normally recharged during operation of the device that battery serves. However, even where the battery is rechargeable, it will eventually, through wear and tear, become unable to accept and maintain a charge and will have to be replaced. Additionally, when work is being done on or near the electrical system of, for example, a vehicle, it may be a wise precaution to disconnect the battery from the electrical system to prevent the possibility of being shocked or having an electrical surge damage tools or the equipment being serviced.

Battery cables are typically attached to the terminal post of a battery using a clamp type battery connector. These connectors include a conductor terminating portion for accommodating a stripped end of the battery cable, a post-engaging portion for engaging the battery terminal post and a clamping portion which is tightened around the terminal post to provide secure connection thereto. The clamping portion of most battery connectors includes a pair of arms defining a circular portion therebetween which may be positioned around the battery terminal post. The ends of the arms may be brought together with a fastening device such as a nut and bolt or a camming member to tightly secure the arms about the battery post.

However, even when the clamping portion is tightened, such battery terminals may move or slide relative to the terminal post in environments in which vibration and the like occurs, for example in vehicle engines. This is particularly true for terminal posts which have a tapered profile. As both the inside surface of the post-engaging portion and the outside surface of the terminal post are relative smooth, relative movement over time can occur. In order to prevent this movement, various battery terminals have included ridges or dimples on the inside surface of the post-engaging portion. The ridges or dimples are adapted to penetrate the terminal post when the clamping portion is clamped thereto. While this provides additional retention, the penetration of the terminal post by the ridges or dimples damages the terminal post during the lifetime of the battery.

Further designs may include multiple wedge blocks that are translated against each other to apply a clamping force about a clamp which is positioned around the terminal post. Again, such designs may lead to inadequate translation of a force from the nut torque to the clamping mechanism positioned around the battery post such that an inadequate amount of clamping force is provided.

It would, therefore, be beneficial to provide a battery terminal which facilitates termination of the battery terminal to the battery terminal post and which provides sufficient retention force with less components and without damaging the terminal post or the battery.

SUMMARY OF THE INVENTION

An embodiment is directed to a battery terminal connector assembly for attaching to a terminal post of a battery, the battery terminal connector assembly includes a biasing portion and a post engagement portion. The biasing portion has a first terminal post receiving opening. A biasing wall extends about a circumference of the first terminal post receiving opening. The post engagement portion has a second terminal post receiving opening for receiving the battery terminal post therein. Engagement walls extend about a circumference of the second terminal post receiving opening. The biasing portion is movable relative to the post engagement portion between a first insertion position and a second termination position. As the biasing portion is moved from the first insertion position to the second termination position, the biasing wall engages the engagement walls and moves the engagement walls into mechanical and electrical engagement with the battery terminal post positioned in the second terminal receiving opening of the post engagement portion.

An embodiment is directed to a battery terminal connector assembly for attaching to a terminal post of a battery, the battery terminal connector assembly includes a biasing portion and a post engagement portion. The biasing portion has a first terminal post receiving opening. A biasing wall extends about a circumference of the first terminal post receiving opening. A first offset portion is positioned at an end of the biasing portion, the first offset portion extends in a plane which is offset from the plane of a main body portion of the biasing portion. A post engagement portion has a second terminal post receiving opening for receiving the battery terminal post therein. Engagement walls extend about a circumference of the second terminal post receiving opening. A second offset portion is positioned at an end of the post engagement portion, the second offset portion extends in a plane which is offset from the plane of a main body portion of the post engagement portion. The second offset portion engages the first offset portion to space apart the main body portion of the post engagement portion and the main body portion of the biasing portion. The biasing portion is movable relative to the post engagement portion between a first insertion position in which the biasing portion and the post engagement portion are spaced apart and a second termination position in which the main body portion of the biasing portion is moved toward the main body portion of the post engagement portion. As the biasing portion is moved from the first insertion position to the second termination position, the biasing wall engages the engagement walls and moves the engagement walls into mechanical and electrical engagement with the battery terminal post positioned in the second terminal receiving opening of the post engagement portion.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
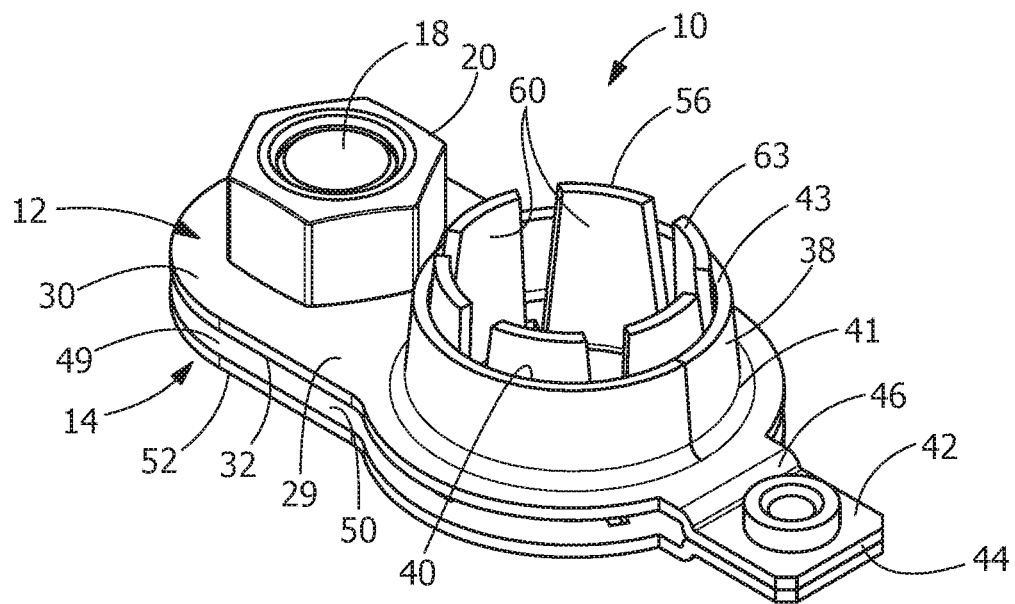
FIG. 1 is a top perspective view of an illustrative embodiment of a battery terminal according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
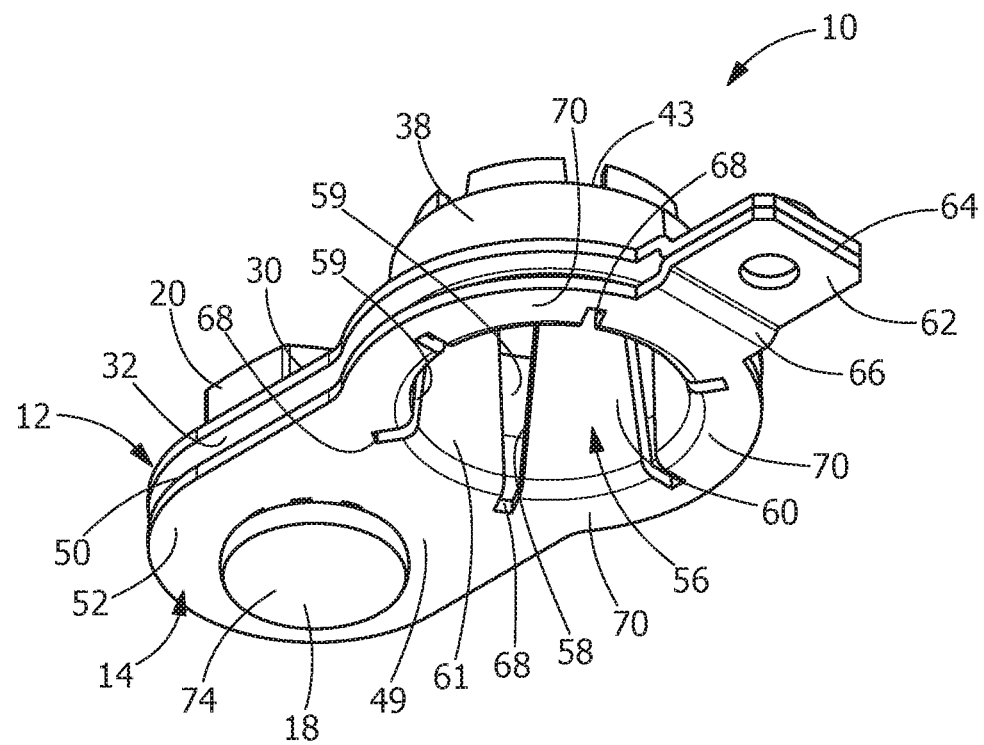
FIG. 2 is a bottom perspective view of the battery terminal of FIG. 1.

Referring to FIGS. 1 and 2, an illustrative embodiment of a battery terminal connector assembly 10 of the present invention is shown. The connector assembly 10 includes a biasing portion 12, a post engagement portion 14, a fastening post 18 and a fastening member 20.

Figure 3:
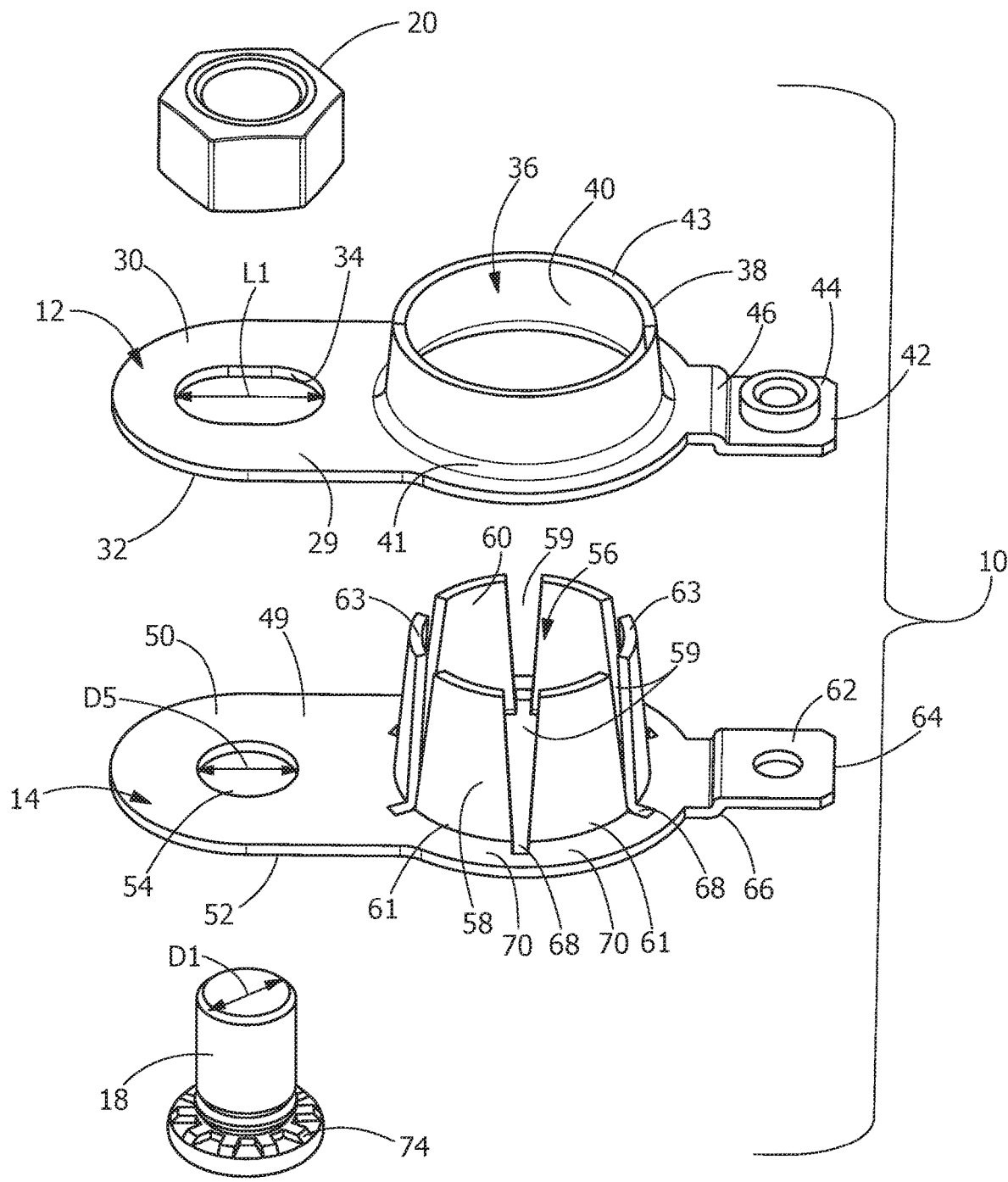
FIG. 3 is an exploded perspective view of the battery terminal of FIG. 1.
Figure 4:
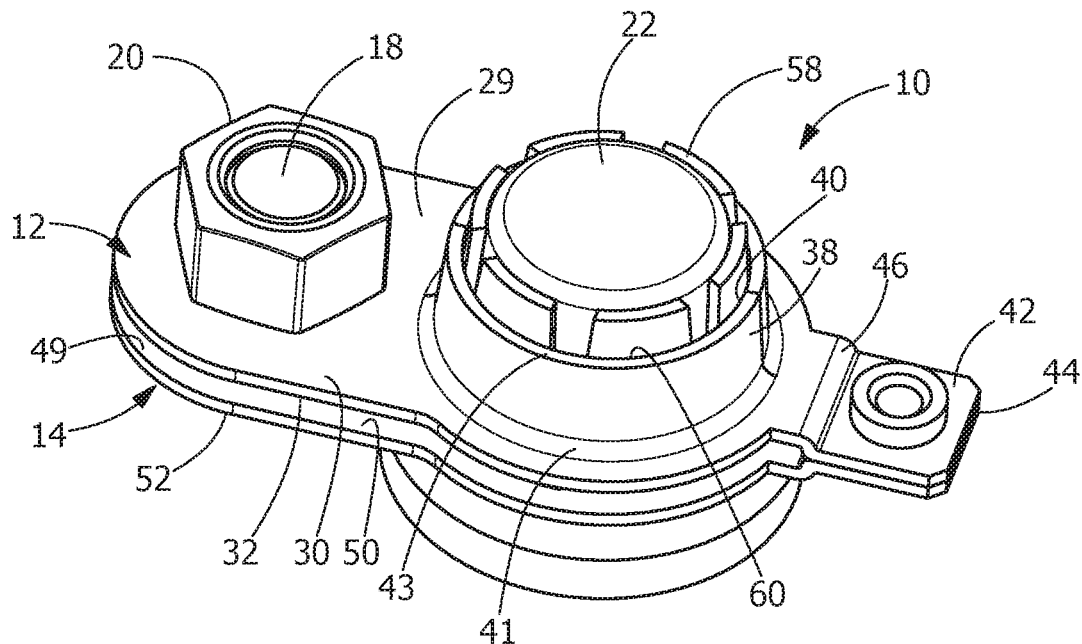
FIG. 4 is side perspective view of the battery terminal inserted onto a battery terminal post in an initial or insertion position prior to the insertion of a fastening member onto a fastening post.

The biasing portion 12 has a main body portion 29 with a first or upper surface 30 and an oppositely facing second or lower surface 32. The biasing portion 12 is made from electrically conductive material, such as, but not limited brass. A fastening post receiving opening 34 extends from the first surface 30 to the second surface 32. The opening 34 has an oblong configuration, as shown in FIG. 3. The opening 34 has a length L1 which is larger than the diameter D1 of the fastening post 18. However, the opening 34 may have different configurations.

A terminal post receiving opening 36 extends from the first surface 30 to the second surface 32. The terminal post receiving opening 36 is spaced from the fastening post receiving opening 34. An arcuate or radiused tapered biasing wall 38 extends about the circumference of the terminal post receiving opening 36. The biasing wall 38 extends from the first surface 30 in a direction away from the second surface 32. The biasing wall 38 has an inner surface 40.

The biasing wall 38 has a base 41 and a free end 43. As the biasing wall 38 is tapered, the diameter D2 (FIG. 5) of the terminal post receiving opening 36 at the free end 43 of the biasing wall 38 is less than the diameter D3 (FIG. 5) of the terminal post receiving opening 36 at the base 41 of the biasing wall 38. The diameter D3 of the terminal post receiving opening 36 at the base 41 of the biasing wall 38 is approximately equal to, but slightly larger, the diameter D4 of the terminal post 22 onto which the biasing portion 12 is inserted.

An offset portion 42 is positioned at an end 44 of the biasing portion 12. The offset portion 42 extends in a plane which is offset from the plane of the main body portion 29. A transition or jog portion 46 extends between the main body portion 29 and the offset portion 42. The offset portion 42 is offset from, for example positioned below, the second surface 32 of the main body portion 29.

The post engagement portion 14 has a main body portion 49 with a first or upper surface 50 and an oppositely facing second or lower surface 52. The post engagement portion 14 is made from electrically conductive material, such as, but not limited brass. A fastening post receiving opening 54 extends from the first surface 50 to the second surface 52. The opening 54 has a circular configuration, as shown in FIG. 3. The opening 54 has a diameter D5 which is approximately equal to the diameter D1 of the fastening post 18. However, the opening 54 may have different configurations.

Figure 7:
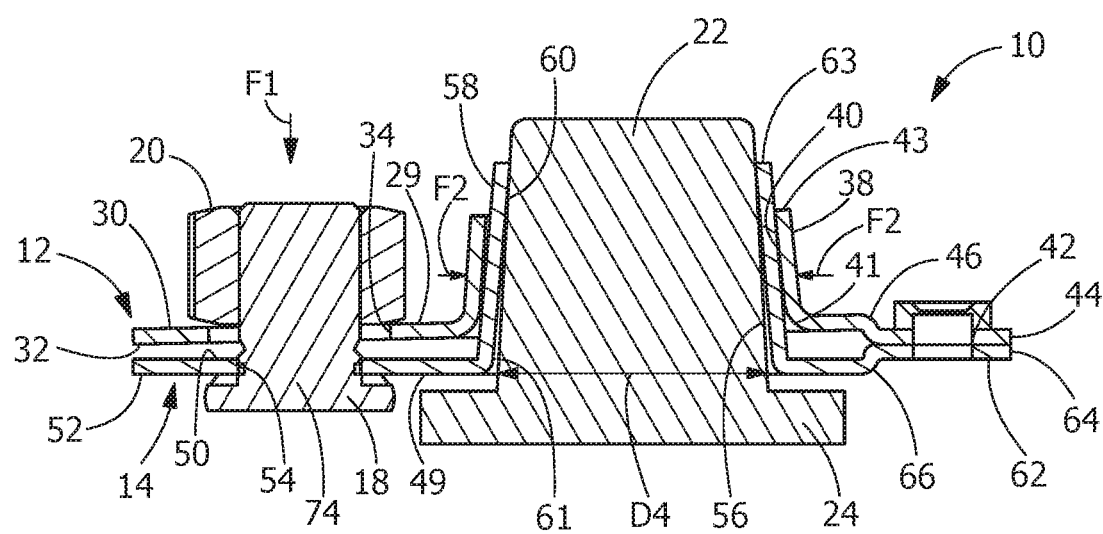
FIG. 7 is a cross-sectional view taken along line 7-7 of FIG. 6.
Figure 8:
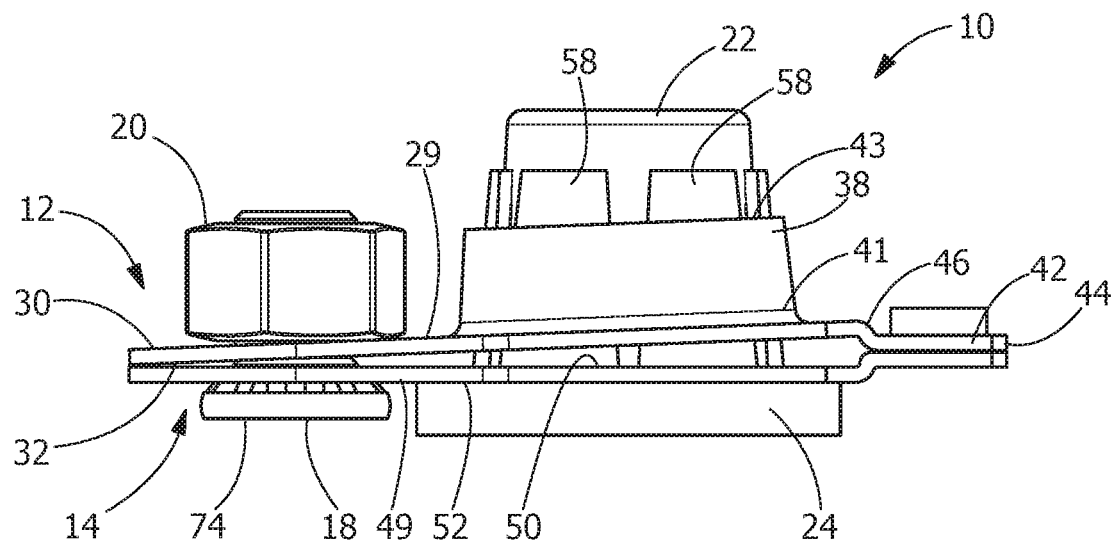
FIG. 8 is side perspective view of the battery terminal inserted onto a battery terminal with the fastening member positioned on the fastening post, the battery terminal is shown in a fully engaged or termination position.
Figure 9:
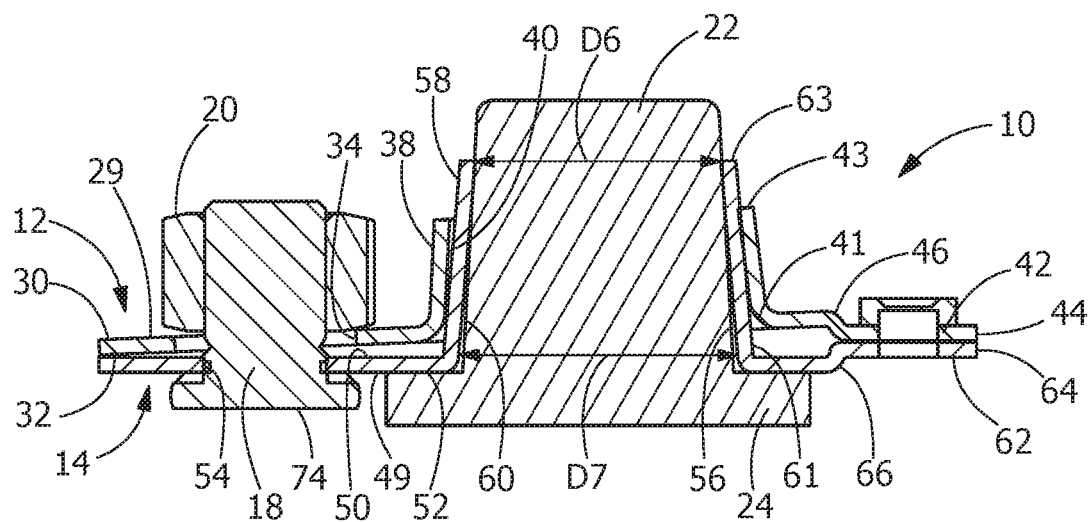
FIG. 9 is a cross-sectional view taken along line 9-9 of FIG. 8.

A terminal post receiving opening 56 extends from the first surface 50 to the second surface 52. The terminal post receiving opening 56 is spaced from the fastening post receiving opening 54. Arcuate or radiused tapered engagement walls 58 extend about the circumference of the terminal post receiving opening 56. The engagement walls 58 extend from the first surface 50 in a direction away from the second surface 52. The engagement walls 58 have inner surfaces 60 which are configured to engage the terminal post 22 when the battery terminal connector assembly 10 is moved to the fully terminated position, as shown in FIGS. 8 and 9, as will be more fully described. The engagement walls 58 are spaced apart by slots 59. Each engagement wall 58 has a base 61 and a free end 63. As the engagement walls 58 are tapered, the diameter D6 (FIG. 9) of the terminal post receiving opening 56 at the free ends 63 of the engagement walls 58 is less than the diameter D7 (FIG. 9) of the terminal post receiving opening 56 at the base 61 of the engagement walls 58. The diameter D7 of the terminal post receiving opening 56 at the base 61 of the engagement walls 58 is approximately equal to the diameter D4 (FIG. 7) of the terminal post 22 onto which the post engagement portion 14 is inserted.

An offset portion 62 is positioned at an end 64 of the post engagement portion 14. The offset portion 62 extends in a plane which is offset from the plane of the main body portion 49. A transition or jog portion 66 extends between the main body portion 49 and the offset portion 62. The offset portion 62 is offset from, for example positioned above, the first surface 50 of the main body portion 49.

Cut outs or openings 68 are provided proximate the engagement walls 58 of the post engagement portion 14. The openings 68 extend from the first surface 50 to the second surface 52 of the post engagement portion 14 and are positioned in line with the slots 59. As shown in FIG. 3, the openings 68 extend outwardly from the terminal post receiving opening 56. Resilient portions 70 of the post engagement portion 14 are formed by the positioning of the openings 68.

The fastening post 18 may be a threaded bolt that is rotationally fixed. The fastening post 18 may be rotationally fixed by securing a head 74 of the fastening post 18 such that it cannot spin or rotate. The fastening member 20, such as, but not limited to, a nut, is threaded on the fastening post 18. A conductor termination member (not shown) or other component may be attached to the fastening post 18.

Figure 5:
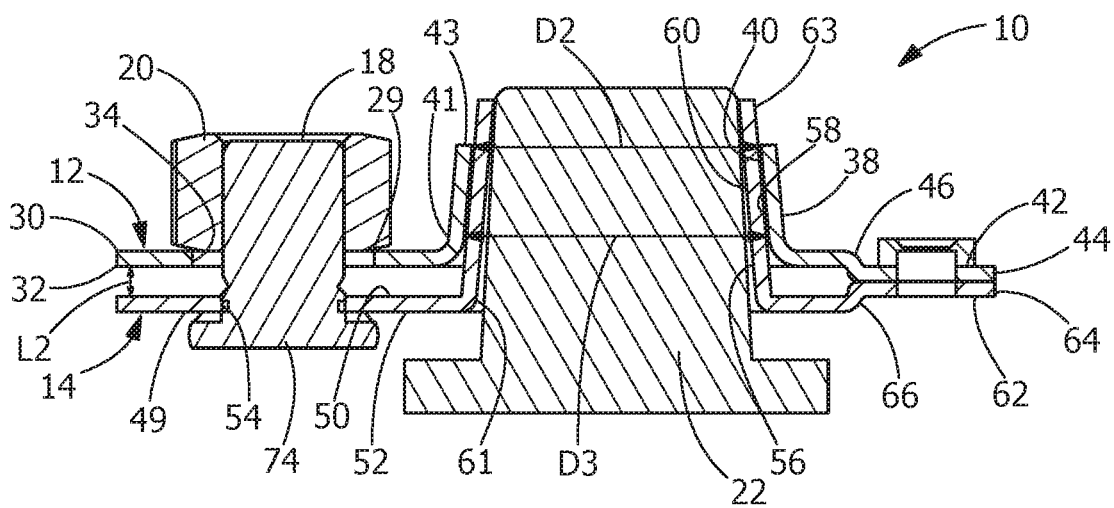
FIG. 5 is a cross-sectional view taken along line 5-5 of FIG. 4.
Figure 6:
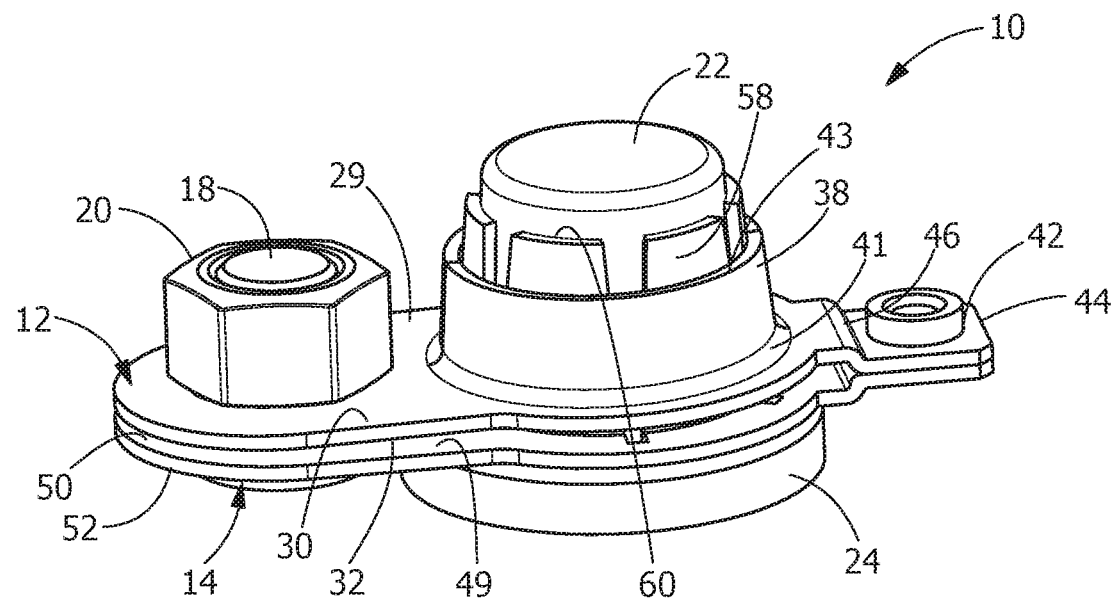
FIG. 6 is side perspective view of the battery terminal inserted onto a battery terminal with the fastening member positioned on the fastening post, the battery terminal is shown intermediate position.

Referring to FIGS. 5 through 9, the operation of the battery connector assembly 10 will be described. As shown in FIGS. 5 and 6, the battery connector assembly 10 is inserted onto the battery terminal post 22 when the battery connector assembly 10 is an the initial or insertion position. In this initial position, the fastening member 20 is not tightened. The offset portion 42 of the biasing portion 12 is provided in engagement with the offset portion 62 of the post engagement portion 14. The offset portion 42 and the offset portion 62 may be retained in engagement by mounting hardware (not shown) or be welding, adhesive or other known methods of fixing one member to another member. In this position, the transition portions 46 and 66 space apart the main body portion 29 of the biasing portion 12 and the main body portion 49 of the post engagement portion 14 by a length or distance L2 (FIG. 5). With the battery connector assembly 10 positioned in the initial position, the biasing wall 38 is positioned between the bases 61 and the free ends 63 of the engagement walls 58. In this position, due to the relative dimensions of the diameters of the biasing wall 38 and the engagement walls 58 at this height, the inner surface 40 of the biasing wall 38 do not engage the engagement walls 58 and do not force the engagement walls 58 toward the terminal post 22. This allows the diameter D6 provided between the inner surface 60 at the base 61 of the engagement wall 58 of the post engagement portion 14 to be larger than the diameter D4 (FIG. 7) of a terminal post 22, allowing the battery connector assembly 10 to be easily inserted onto the battery terminal post 22. The battery connector assembly 10 is inserted onto the terminal post 22 until the second surface 52 of the battery connector assembly 10 is proximate to or engages a base 24 of the terminal post 22.

With the battery connector assembly 10 properly positioned on the battery terminal post 22 in the initial position, the fastening member 20 is tightened on the fastening post 18. As this occurs, the fastening member 20 engages the first surface 30 of the biasing portion 12. Continued tightening of the fastening member 20 imparts a downward force F1 on the biasing portion 12, as shown in FIG. 7, causing the main body portion 29 of the biasing portion 12 to pivot about the offset portion 42, allowing the main body portion 29 of the biasing portion 12 to move toward the main body portion 49 of the post engagement portion 14. This causes the biasing wall 38 to move toward the bases 61 of the engagement walls 58. As this occurs the downward force F1 is translated into a horizontal force F2 of the biasing wall 38 which is applied to the engagement walls 58 of the post engagement portion 14.

Continued tightening of the fastening member 20 continues to apply the downward force F1 on the biasing portion 12 which in turn, causes further movement of the main body portion 29 of the biasing portion 12 toward the main body portion 49 of the post engagement portion 14, and causes further movement of the biasing wall 38 to toward the bases 61 of the engagement walls 58. As this occurs the downward force F1 is translated into further horizontal force F2 of the biasing wall 38 which is applied to the engagement walls 58 of the post engagement portion 14.

Tightening of the fastening member 20 continues until the base 41 of the biasing wall 38 of the biasing portion 12 is positioned in the fully engaged or termination position, as shown in FIG. 8. In this position, the base 41 of the biasing wall 38 of the biasing portion 12 is aligned with the base 61 of the engagement walls 58 of the post engagement portion 14. In this position, the inner surface 40 of the biasing wall 38 exert a force F2 on the engagement walls 58, causing the inner surfaces 60 of the engagement 58 walls to exert a force F2 on the battery terminal post 22.

The force provided by the inner surface 40 of the biasing wall 38 and the inner surface 60 of the engagement wall 58 creates an evenly distributed, controlled, specific and repeatable force which in turn provides a controlled, specific and repeatable mechanical and electrical connection between the battery connector assembly 10 and the terminal post 22, without causing damage to the terminal post 22. The retention force exerted by the battery connector assembly 10 provide sufficient retention force to prevent the unwanted movement of the battery connector assembly 10 relative to the terminal post 22 even in environments where the terminal post 22 and the battery connector assembly 10 are subjected to harsh vibrations and the like.

The battery connector assembly 10 of the present invention may be sized to accommodate different sized terminal posts 22. For example, the positive terminal may have a different diameter from the negative battery terminal. The biasing portion 12 and the post engagement portion 14 of the battery connector assembly 10 can be scaled or dimensioned to accommodate either the positive or negative terminal posts. In these instances, the battery connector assembly 10 may also be color coded to indicate which size and which terminal is to be used with each connector.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery terminal connector assembly for attaching to a terminal post of a battery, the battery terminal connector assembly comprising:
a biasing portion having a first terminal post receiving opening extending from a main body portion of the biasing portion, a biasing wall extending about a circumference of the first terminal post receiving opening, a first fastening post receiving opening spaced from the first terminal receiving opening and extending from the main body portion of the biasing portion;
a post engagement portion having a second terminal post receiving opening extending from a main body portion of the post engagement portion for receiving the battery terminal post therein, engagement walls extending about a circumference of the second terminal post receiving opening, a second fastening post receiving opening spaced from the second terminal receiving opening and extending from the main body portion of the post engagement portion;
the first fastening post receiving opening having a length which is larger than a diameter of the second fastening post receiving opening;
the biasing portion being movable relative to the post engagement portion between a first insertion position and a second termination position, wherein as the biasing portion is moved from the first insertion position to the second termination position, the biasing wall engages the engagement walls and moves the engagement walls into mechanical and electrical engagement with the battery terminal post positioned in the second terminal receiving opening of the post engagement portion.

2. The battery terminal connector assembly as recited in claim 1, wherein the main body portion of the biasing portion has a first surface and an oppositely facing second surface, the first fastening post receiving opening extends from the first surface to the second surface.

3. The battery terminal connector assembly as recited in claim 2, wherein the fastening post receiving opening has an oblong configuration.

4. The battery terminal connector assembly as recited in claim 1, wherein the biasing wall has a radiused and tapered configuration.

5. The battery terminal connector assembly as recited in claim 4, wherein the biasing wall has a base and a free end, the diameter of the first terminal post receiving opening at the free end of the biasing wall is less than the diameter of the first terminal post receiving opening at the base of the biasing wall.

6. The battery terminal connector assembly as recited in claim 2, wherein the biasing portion has an offset portion positioned at an end of the biasing portion, the offset portion extends in a plane which is offset from the plane of the main body portion.

7. The battery terminal connector assembly as recited in claim 6, wherein a transition portion extends between the main body portion and the offset portion.

8. The battery terminal connector assembly as recited in claim 1, wherein the post engagement portion has a main body portion with a first surface and an oppositely facing second surface, a second fastening post receiving opening extends from the first surface to the second surface.

9. The battery terminal connector assembly as recited in claim 8, wherein the second fastening post receiving opening has a circular configuration with a diameter equal to a diameter of a fastening post.

10. The battery terminal connector assembly as recited in claim 1, wherein the engagement walls have a radiused and tapered configuration.

11. The battery terminal connector assembly as recited in claim 10, wherein the engagement walls are spaced apart by slots.

12. The battery terminal connector assembly as recited in claim 11, wherein each of the engagement walls have a base and a free end, the diameter of the second terminal post receiving opening at the free ends of the engagement walls is less than the diameter of the second terminal post receiving opening at the base of the engagement walls.

13. The battery terminal connector assembly as recited in claim 8, wherein the post engagement portion has an offset portion positioned at an end of the post engagement portion, the offset portion extends in a plane which is offset from the plane of the main body portion.

14. The battery terminal connector assembly as recited in claim 13, wherein a transition portion extends between the main body portion and the offset portion.

15. The battery terminal connector assembly as recited in claim 12, wherein cut outs are provided proximate the engagement walls of the post engagement portion, the cut outs extend from the first surface to the second surface of the post engagement portion and are positioned in line with the slots.

16. The battery terminal connector assembly as recited in claim 1, wherein a fastening post extends through a first fastening post receiving opening of the biasing portion and a second fastening post receiving opening of the post engagement portion.

17. A battery terminal connector assembly for attaching to a terminal post of a battery, the battery terminal connector assembly comprising:
a biasing portion having a first terminal post receiving opening extending from a main body portion of the biasing portion, a biasing wall extending about a circumference of the first terminal post receiving opening, a first offset portion positioned at an end of the main body portion of the biasing portion, the first offset portion being spaced from the first terminal receiving opening and extending in a plane which is offset from the plane of the main body portion of the biasing portion;
a post engagement portion having a second terminal post receiving opening extending from a main body portion of the post engagement portion for receiving the battery terminal post therein, engagement walls extending about a circumference of the second terminal post receiving opening, a second offset portion positioned at an end of the main body portion of the post engagement portion, the second offset portion being spaced from the second terminal receiving opening and extending in a plane which is offset from the plane of the main body portion of the post engagement portion, the second offset portion engages the first offset portion to space apart the main body portion of the post engagement portion and the main body portion of the biasing portion;
the biasing portion being movable relative to the post engagement portion between a first insertion position in which the biasing portion and the post engagement portion are spaced apart and a second termination position in which the main body portion of the biasing portion is moved toward the main body portion of the post engagement portion, wherein as the biasing portion is moved from the first insertion position to the second termination position, the biasing wall engages the engagement walls and moves the engagement walls into mechanical and electrical engagement with the battery terminal post positioned in the second terminal receiving opening of the post engagement portion.

18. The battery terminal connector assembly as recited in claim 17, wherein the biasing wall has a radiused and tapered configuration, the biasing wall has a base and a free end, the diameter of the first terminal post receiving opening at the free end of the biasing wall is less than the diameter of the first terminal post receiving opening at the base of the biasing wall.

19. The battery terminal connector assembly as recited in claim 18, wherein the engagement walls have a radiused and tapered configuration and are spaced apart by slots, the diameter of the second terminal post receiving opening at the free ends of the engagement walls is less than the diameter of the second terminal post receiving opening at the base of the engagement walls.

20. The battery terminal connector assembly as recited in claim 19, wherein a fastening post extends through a first fastening post receiving opening of the biasing portion and a second fastening post receiving opening of the post engagement portion.

\* \* \* \* \*